United States Patent
Nakata et al.

(10) Patent No.: US 10,152,045 B2
(45) Date of Patent: Dec. 11, 2018

(54) AUTOMATIC PROGRAMMING DEVICE AND METHOD THEREFOR

(71) Applicant: AMADA HOLDINGS CO., LTD., Kanagawa (JP)

(72) Inventors: Tsutomu Nakata, Kanagawa (JP); Chitra Malini Thanapandi, Kanagawa (JP); Ravindran Dhanabalan, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 72 days.

(21) Appl. No.: 15/515,749

(22) PCT Filed: Aug. 7, 2015

(86) PCT No.: PCT/JP2015/072535
§ 371 (c)(1),
(2) Date: Mar. 30, 2017

(87) PCT Pub. No.: WO2016/051961
PCT Pub. Date: Apr. 7, 2016

(65) Prior Publication Data
US 2017/0336779 A1   Nov. 23, 2017

(30) Foreign Application Priority Data
Oct. 3, 2014   (JP) ................ 2014-204967

(51) Int. Cl.
*G05B 19/4093* (2006.01)
*G06F 17/50* (2006.01)
(Continued)

(52) U.S. Cl.
CPC ... *G05B 19/40932* (2013.01); *G05B 19/4093* (2013.01); *G06F 17/50* (2013.01);
(Continued)

(58) Field of Classification Search
CPC .......... G05B 19/40932; G05B 19/4093; G05B 2219/35162; G05B 2219/45041;
(Continued)

(56) References Cited

U.S. PATENT DOCUMENTS 6,520,057 B1 *   2/2003   Steadman ................ B26D 5/00
                                                              700/134
2013/0066447 A1 *   3/2013   Baierl-Moehler .......................
                                                     G05B 19/40938
                                                              700/86
2014/0081603 A1   3/2014   Griffith et al.

FOREIGN PATENT DOCUMENTS

JP     7-200021    8/1995
JP     9-128422    5/1997
(Continued)

OTHER PUBLICATIONS

Search Report issued in International Patent Application No. PCT/JP2015/072535, dated Sep. 15, 2015.
(Continued)

*Primary Examiner* — Michael J Brown
(74) *Attorney, Agent, or Firm* — Greenblum & Bernstein, P.L.C.

(57) ABSTRACT

In a machining system that conducts nesting to arrange parts over a workpiece and machines the workpiece with a machine tool according to a result of the nesting, there is an automatic programming device for preparing a nesting machining program for the machine tool, wherein nested workpiece information relating to the workpiece nested is acquired according to the information relating to the parts and the information relating to the workpiece, sections that require no re-nesting in the nested workpiece information are locked according to the operator's designation, re-nesting is conducted on sections other than the locked sections.

5 Claims, 7 Drawing Sheets

(51) Int. Cl.
*G06Q 10/04* (2012.01)
*G05B 19/409* (2006.01)

(52) U.S. Cl.
CPC ... *G06Q 10/04* (2013.01); *G05B 2219/35162* (2013.01); *G05B 2219/45041* (2013.01); *Y02P 90/265* (2015.11)

(58) Field of Classification Search
CPC . Y10T 83/9423; Y10T 83/178; Y10T 83/536; Y10T 83/538; B26D 5/00; B26D 5/005; B21D 28/002
USPC .................................................. 700/114, 134
See application file for complete search history.

(56) References Cited

FOREIGN PATENT DOCUMENTS

| JP | 2001-184110 | 7/2001 |
|---|---|---|
| JP | 2001-184112 | 7/2001 |
| JP | 2002-337040 | 11/2002 |
| JP | 2006-7274 | 1/2006 |
| JP | 2006-7275 | 1/2006 |
| JP | 2012-79096 | 4/2012 |
| JP | 2014-21657 | 2/2014 |

OTHER PUBLICATIONS

Office Action issued in related Japan Patent Appl. No. 2014-204967, dated Jan. 27, 2017, along with an english translation thereof.
Written Opinion Report issued in International Patent Application No. PCT/JP2015/072535, dated Sep. 15, 2015.
Decision to Grant Patent in JP 2014-204967 dated Apr. 12, 2017 with English language translation.
Notification of Reasons of Refusal in JP 2014-204967 dated Jan. 27, 2017 with English language translation.
Official Communication issued in European Patent Office (EPO) Patent Application No. 15845866.1, dated May 29, 2018.
Anonymous: "SS-NEST—Automated Nesting Software", Internet Citation, Apr. 2009, XP002629188, pp. 1-4.

* cited by examiner

AUTOMATIC PROGRAMMING DEVICE AND METHOD THEREFOR

TECHNICAL FIELD

The present invention relates to an automatic programming device and a method therefor, for preparing a nesting program to nest (make a cutting plan of) parts over a workpiece such as a sheet (sheet material) and machine the parts.

BACKGROUND ART

Conventionally, an operator checks an entire layout of parts automatically arranged over a plurality of sheets according to automatic nesting. If found a low-yield sheet, the operator conducts optimization by manually rearranging parts with the use of parts moving and copying commands.

Figure 9:
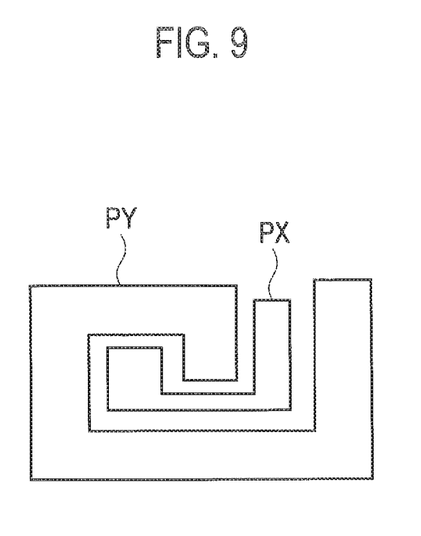
FIG. 9 is a conventional view explaining a related art.

For example, a high-yield layout of parts PX and PY shown in FIG. 9 is unachievable by automation. If such parts PX and PY are automatically nested, a low-yield layout will be made, and therefore, the operator has to manually arrange the parts PX and PY.

PRIOR ART DOCUMENTS

Patent Documents

Patent Document 1: Japanese Patent Application Publication No. 2006-007274
Patent Document 2: Japanese Patent Application Publication No. 2006-007275

SUMMARY OF THE INVENTION

According to the conventional automatic nesting, an operator must entirely manually edit parts on a sheet with the use of sheet editing commands, thereby needing time and labor for optimization. In particular, if the editing must be carried out over a plurality of sheets, there will be a problem of further increasing labor of the operator.

Accordingly, the present invention has been made in consideration of the above-mentioned problems. An object of the invention is to provide an automatic programming device and a method therefor, capable of simplifying a sheet program data editing operation conducted by operator and shortening a data preparation time.

In order to solve the above-mentioned problems, one characteristic of the present invention provides an automatic programming device for preparing a nesting machining program for a machine tool in a machining system that conducts nesting to arrange parts over a workpiece and machines the workpiece with the machine tool according to a result of the nesting.

The automatic programming device includes a storage means to store information relating to the parts subjected to the nesting and information relating to the workpiece, an input means with which an operator designates parts or sheets, and a control means to carry out:

(A) a process of acquiring nested workpiece information relating to the workpiece nested according to the information relating to the parts and the information relating to the workpiece;

(B) a process of locking sections that require no re-nesting in the nested workpiece information according to the operator's designation;

(C) a process of conducting re-nesting on sections other than the locked sections; and (D) a process of preparing a nesting machining program according to all nesting results.

According to another characteristic of the present invention, the control means sets priority order on the sections other than the locked sections, and according to the priority order, conducts the re-nesting process on the sections other than the locked sections.

According to another characteristic of the present invention, the locked sections are at least one of the parts and sheets.

Another characteristic of the present invention provides an automatic programming method for an automatic programming device having an input means, a storage means, and a control means in a machining system that conducts nesting to arrange parts over a workpiece, and according to a result of the nesting, makes a machining tool machine the workpiece, the method allowing the automatic programming device to prepare a nesting machining program for the machine tool and including:

(A) a step of making the control means acquire nested workpiece information relating to the workpiece nested according to information relating to the parts and workpiece read out of the storage means;

(B) a step of making the control means lock sections that require no re-nesting in the nested workpiece information according to operator's designation entered with the input means;

(C) a step of making the control means conduct re-nesting on sections other than the sections locked in the step (B); and (D) a step of making the control means prepare a nesting machining program according to all nesting results.

According to another characteristic of the present invention, the locked sections are at least one of the parts and sheets.

DESCRIPTION OF EMBODIMENTS

Hereinafter, embodiments according to the present invention will be explained with reference to the drawings.

Figure 1:
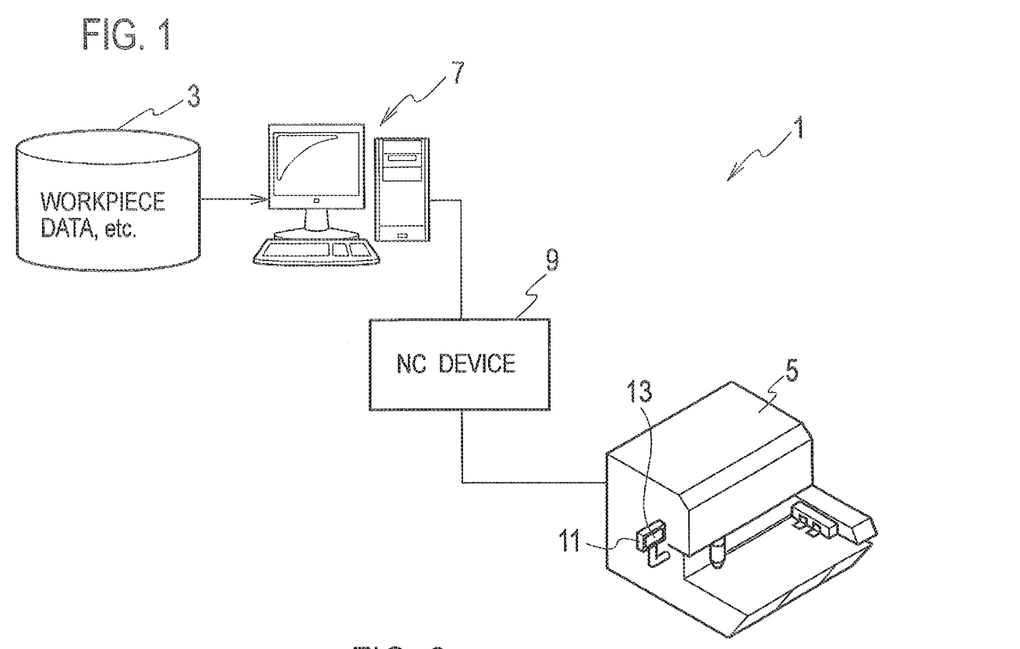
FIG. 1 is an explanatory view schematically showing a laser machining system according to an embodiment of the present invention.

FIG. 1 is an explanatory view schematically showing a laser machining system according to an embodiment of the present invention.

In this embodiment, a machine tool that machines parts after the parts are nested is a laser machine tool as an example. The present invention is not limited to this and is applicable to an NC turret punch press, a combined machine, and the like.

As shown in FIG. 1, the laser machining system 1 has an automatic programming device (control means) 7 that uses data of workpieces (sheets) in a database (storage means) 3, to prepare a machining program for the laser machine tool 5. NC data based on a given machining program prepared by the automatic programming device 7 is converted by an NC device 9 into drive data, which is sent to the laser machine tool 5. According to the drive data, a control device 11 of the laser machine tool 5 controls various locations to laser-machine a workpiece on a laser machining table.

The database 3 also stores data of machined parts. The control device 11 of the laser machine tool 5 is provided with a display unit 13 to display various pieces of information.

Figure 2:
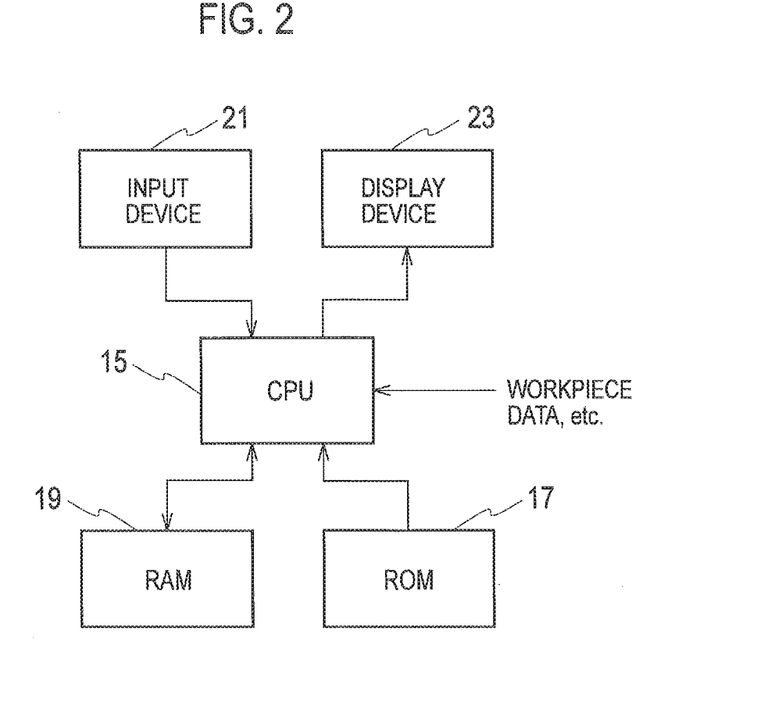
FIG. 2 is a block diagram showing a schematic configuration of an automatic programming device shown in FIG. 1.

FIG. 2 is a block diagram showing a schematic configuration of the automatic programming device 7 shown in FIG. 1.

As shown in FIG. 2, the automatic programming device 7 is a computer having a CPU 15 connected to a ROM 17 and a RAM 19. The CPU 15 is also connected to an input device (input means) 21 such as a keyboard and a display device 23 such as a display. The CPU 15 is connected to the database 3.

In the automatic programming device 7, the CPU 15 follows instructions given by an operator through the input device 21, uses data in the database 3, employs the RAM 19 according to a computer program from the ROM 17, and prepares for the laser machine tool 1 a machining program that includes a nesting process to be explained later.

Next, with reference to FIGS. 3 to 8, a nesting program preparing operation of the automatic programming device 7 shown in FIGS. 1 and 2 will be explained.

Figure 3:
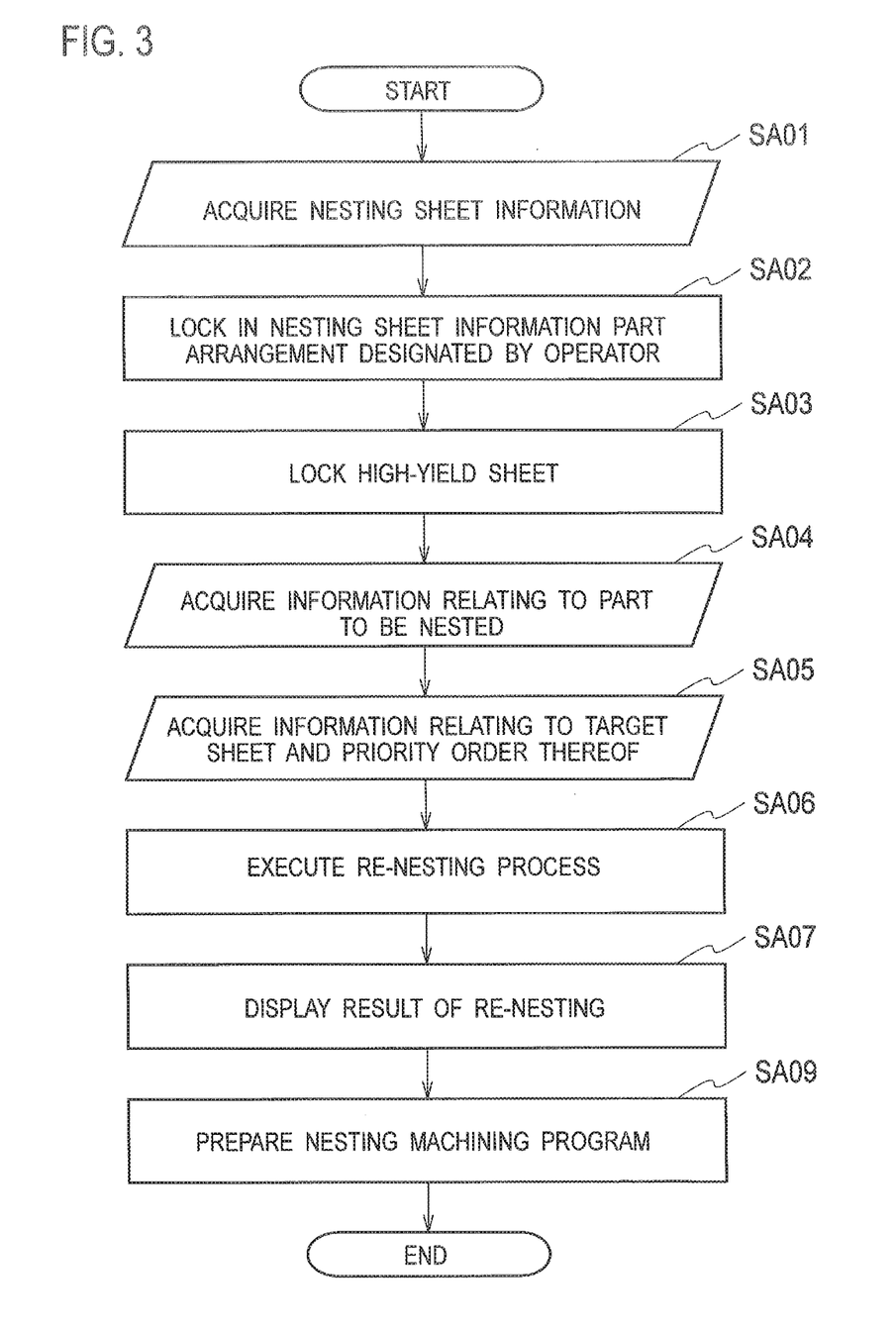
FIG. 3 is a flowchart showing a nesting program preparing operation of the automatic programming device shown in FIG. 1.
Figure 4:
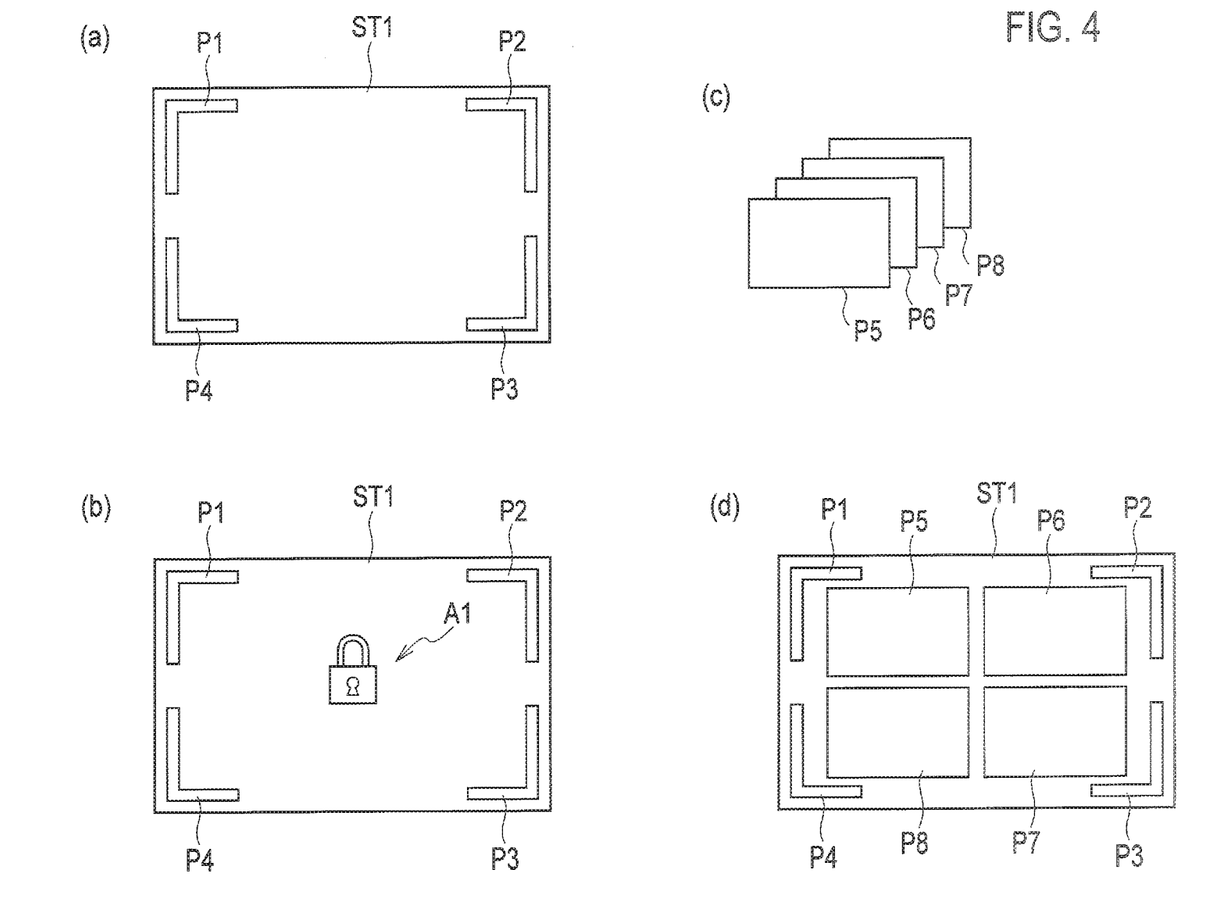
FIG. 4 is an explanatory view showing a nesting program preparing operation of the automatic programming device shown in FIG. 1.
Figure 5:
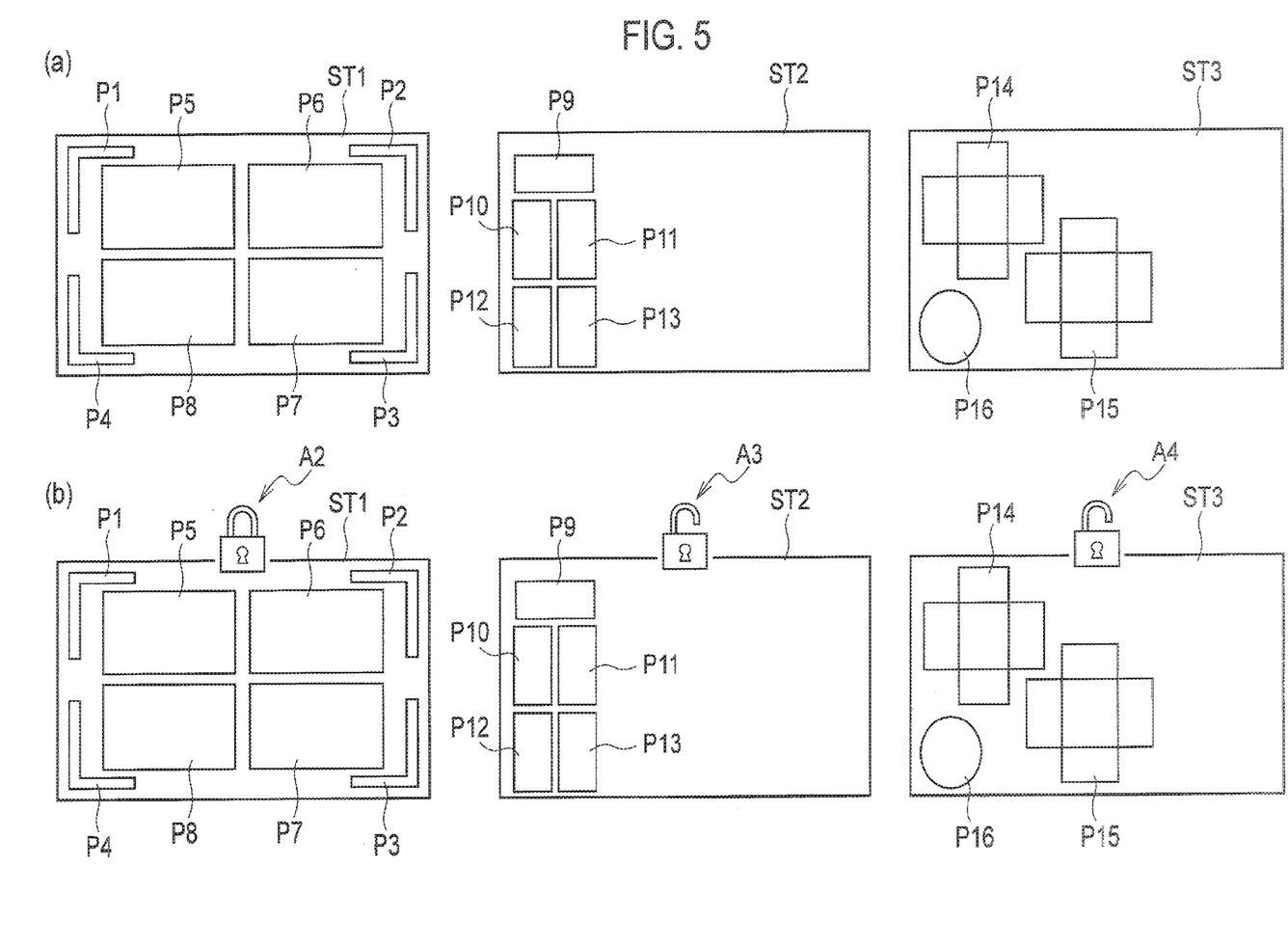
FIG. 5 is an explanatory view showing a nesting program preparing operation of the automatic programming device shown in FIG. 1.
Figure 8:
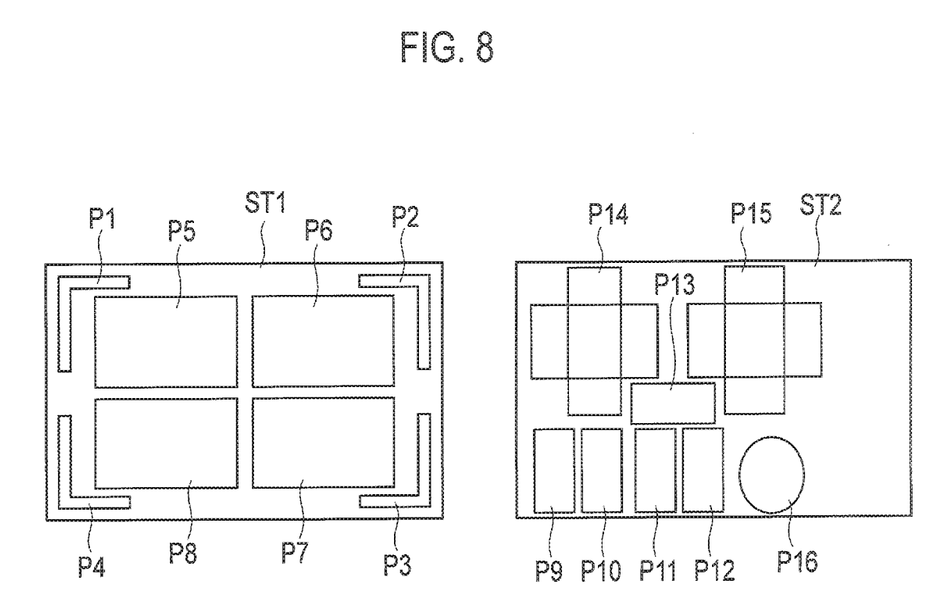
FIG. 8 is an explanatory view showing a nesting program preparing operation of the automatic programming device.

FIG. 3 is a flowchart showing a nesting program preparing operation of the automatic programming device 7 and FIGS. 4, 5, and 8 are explanatory views showing the nesting program preparing operation of the automatic programming device 7.

First, in step SA01, the automatic programming device 7 acquires nesting sheet information (sheet names, the number of sheets, and the like) automatically nested by automatic nesting or manual nesting on the basis of sheet and parts data.

In step SA02, the automatic programming device 7 locks in the nesting sheet information parts arrangements that have been designated by the operator as not requiring re-nesting. For example, the operator designates with the input device 21 serving as the input means the parts arrangements shown in FIG. 4(a) as parts arrangements not requiring re-nesting. Once the parts arrangements are locked, there will be a sheet ST1 having locked parts P1 to P4 as shown in FIG. 4(b). A lock mark A1 shown in FIG. 4(b) indicates that the parts P1 to P4 are locked along the periphery of the sheet ST1.

Locking a parts arrangement is carried out by the operator who specifies with the input device 21 the parts arrangement on the display device 23.

Next, in step SA03, the automatic programming device 7 locks in the nesting sheet information a high-yield sheet designated by the operator as not requiring re-nesting.

For example, there are a plurality of sheets ST1, ST2, and ST3 in FIG. 5(a). As shown in FIG. 5(b), the sheet ST1 designated by the operator as a high-yield sheet not requiring re-nesting is locked and low-yield sheets ST2 and ST3 are unlocked. In FIG. 5(b), a lock mark A2 indicates that the sheet ST1 is locked and lock marks A3 and A4 indicate that the sheets ST2 and ST3 are unlocked.

Locking a high-yield sheet is carried out by the operator by specifying with the input device 21 serving as the input means one or more of a plurality of sheets displayed on the display device 23.

In this example, high-yield sheets not requiring re-nesting are specified by the operator. Instead, the high-yield sheets not requiring re-nesting may automatically be specified and locked.

Next, in step SA04, the automatic programming device 7 acquires information relating to parts to be nested, and in step SA05, acquires information relating to target sheets and priority order thereof. The steps SA04 and SA05 will be explained in detail in each of the cases of locking parts positions (step SA02) and locking sheets (step SA03).

Figure 6:
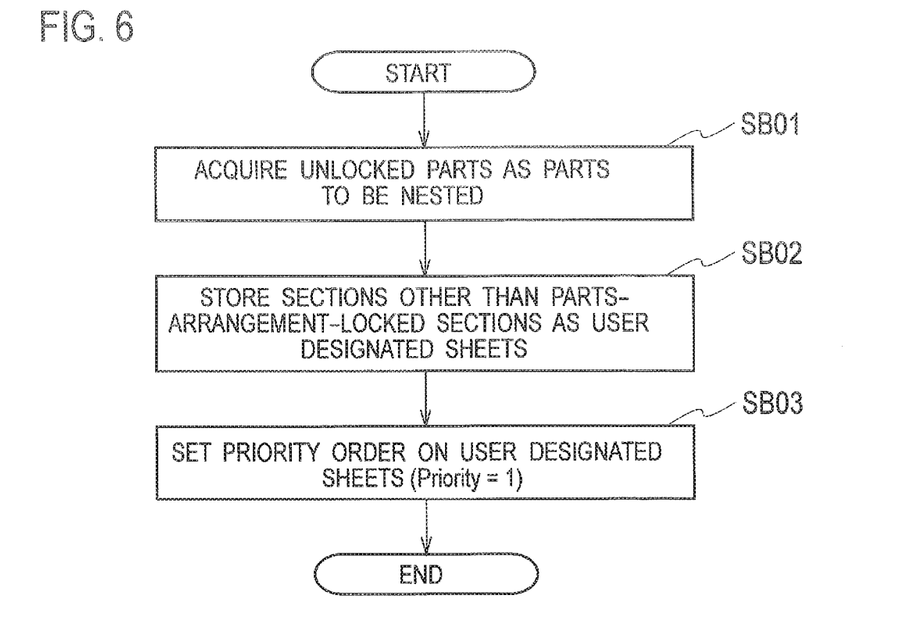
FIG. 6 is a flowchart showing, in a parts-positions-locked state in the flowchart of FIG. 3, a process of acquiring information relating to parts to be nested and a process of acquiring information relating to target sheets and priority order thereof.

FIG. 6 is a flowchart showing a process of acquiring information relating to parts to be nested and a process of acquiring information relating to target sheets and priority order thereof when parts positions are locked.

In step SB01 of FIG. 6, the automatic programming device 7 acquires information relating to parts that are not locked as information relating to parts to be nested (parts that must automatically be arranged). For example, the operator specifies the parts arrangements shown in FIG. 4(a) and locks the parts arrangements. At this time, parts P5 to P8 shown in FIG. 4(c) are assumed to be unlocked parts. Then, information relating to the parts P5 to P8 is acquired as the information relating to parts to be nested.

In step SB02, the automatic programming device 7 stores as a user designated sheet a section other than the parts-arrangement-locked sections. For example, an inner section of the locked parts P1 to P4 on the sheet ST1 shown in FIG. 4(b) is stored as a user designated sheet.

In step SB03, the automatic programming device 7 sets priority order on the stored user designated sheet. For example, the user designated sheet of the inner section of the locked parts P1 to P4 on the sheet ST1 shown in FIG. 4(b) is provided with a priority order of Priority-1.

Returning to FIG. 3, in step SA06, the automatic programming device 7 executes a re-nesting process in the above-mentioned state, to nest the parts P5 to P8 (refer to FIG. 4(c)) obtained from the information relating to parts to be nested over the user designated sheet (the inner section of the locked parts P1 to P4 on the sheet ST1) stored with the priority order of Priority-1, thereby providing a result shown in FIG. 4(d).

In this explanation, there is one level of priority order (Priority-1). If there are a plurality of user designated sheets having a plurality of levels of priority order, parts to be nested are nested on user designated sheets according to the levels of priority order.

Next, in step SA07, the automatic programming device 7 displays a result of the nesting (for example, the state shown in FIG. 4(d)) on the display device 23.

Thereafter, in step SA09, the automatic programming device 7 prepares a nesting machining program according to all nesting results.

Figure 7:
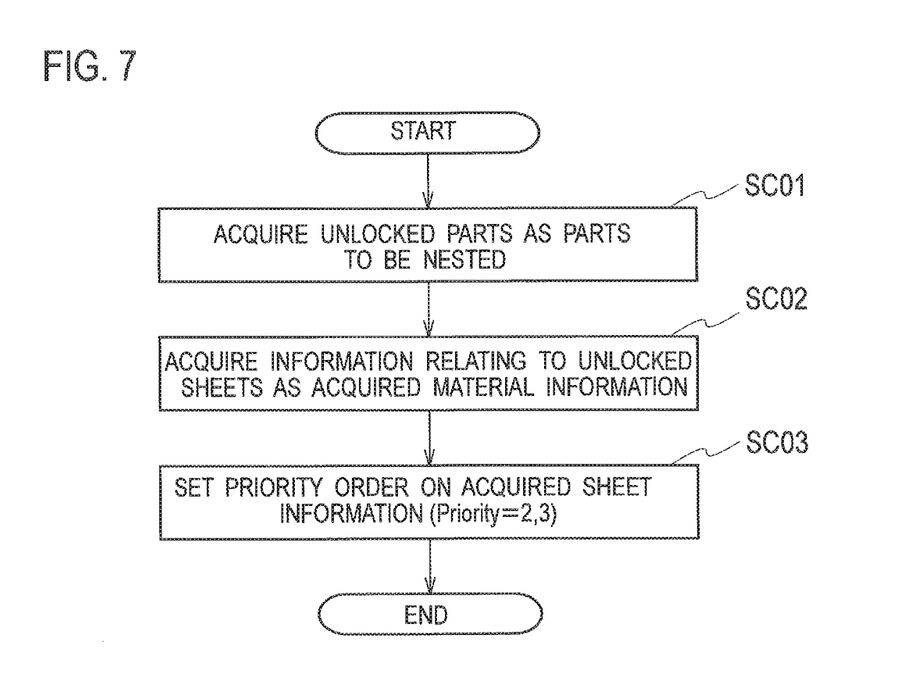
FIG. 7 is a flowchart showing, in a sheet-locked state in the flowchart of FIG. 3, a process of acquiring information relating to parts to be nested and a process of acquiring information relating to target sheets and priority order thereof.

FIG. 7 is a flowchart showing a process of acquiring information relating to parts to be nested and a process of acquiring information relating to target sheets and priority order thereof when sheets are locked.

In step SC01 of FIG. 7, the automatic programming device 7 acquires information relating to parts to be nested from sheets that are not locked. For example, in FIG. 5(b), a sheet ST1 is locked and sheets ST2 and ST3 are not locked. In this case, information relating to parts P9 to P16 on the sheets ST2 and ST3 is acquired as the information relating to parts to be nested.

In step SC02, the automatic programming device 7 acquires information relating to the unlocked sheets as acquired material information (sheets that must automatically be arranged). For example, the sheets ST2 and ST3 shown in FIG. 5(b) that are unlocked are acquired as the acquired material information.

In step SC03, the automatic programming device 7 sets priority order on the acquired material information. For example, the sheets ST2 and ST3 shown in FIG. 5(b) are provided with Priority-2 and Priority-3, respectively.

Returning to FIG. 3, in step SA06, the automatic programming device 7 executes a re-nesting process in the above-mentioned state, to nest the parts P9 to P16 contained in the information relating to parts to be nested over the acquired material information (sheet ST2) stored with the priority order of Priority-2, thereby providing a result shown in FIG. 8(c).

In this example, there are two levels of priority order (Priority-2 and Priority-3). A case with a larger number of levels of priority order is manageable in a similar manner.

The re-nesting process to nest parts to be nested is carried out in order of the case when parts positions are locked and the case when sheets are locked.

Next, in step SA07, the automatic programming device 7 displays a result of the nesting (for example, the state shown in FIG. 8(c)) on the display device 23.

Thereafter, all nesting results are checked, parts arrangements are determined, and the nesting machining program preparing process ends (step SA09).

As mentioned above, this embodiment checks layouts of sheets on which parts are automatically arranged, designates only sheets or parts that must automatically be arranged, and automatically arranges them, thereby providing effects of simplifying a data preparing operation, shortening a data preparation time, and reducing data preparation errors.

The present invention is not limited to the above-mentioned embodiment and is properly modifiable to realize other embodiments.

INDUSTRIAL APPLICABILITY

The present invention is able to simplify a sheet program data preparing operation carried out by operator and shorten a data preparation time.

The invention claimed is:

1. In a machining system that conducts nesting to arrange parts over a workpiece and machines the workpiece with a machine tool according to a result of the nesting, an automatic programming device for preparing a nesting machining program for the machine tool, comprising:
a storage to store information relating to the parts subjected to the nesting and information relating to the workpiece;
a display to display a parts arrangement by the nesting;
an input interface with which an operator designates a predetermined portion;
and a controller to perform operations including:
(A) a process of acquiring nested workpiece information relating to the workpiece nested according to the information relating to the parts and the information relating to the workpiece,
(B) a process of displaying on the display the parts arrangement performed by the nesting on the workpiece,
(C) a process of locking a parts arrangement, that require no re-nesting, designated by the operator with the input interface to the parts arrangement displayed on the display,
(D) a process of conducting re-nesting on sections other than the locked parts arrangement, and
(E) a process of preparing a nesting program according to all nesting results.

2. The automatic programming device as described in claim 1, wherein the controller sets priority order on the parts arrangement other than the locked parts arrangement, and according to the priority order, conducts the re-nesting process on the parts arrangement other than the locked parts arrangement.

3. The automatic programming device as described in claim 1, wherein the locked parts arrangement is at least one of the parts and sheets.

4. In a machining system that conducts nesting to arrange parts over a workpiece and machines the workpiece with a machine tool according to a result of the nesting, an automatic programming method for preparing a nesting machining program for the machine tool by an automatic programming device includes a storage, an input interface, and a controller, comprising:
(A) acquiring nested workpiece information relating to the workpiece nested according to the information relating to the parts and the information relating to the workpiece by the controller,
(B) displaying on the display a parts arrangement conducted by the nesting on the workpiece by the controller,
(C) locking a parts arrangement, that require no re-nesting, designated by the operator with the input interface to the parts arrangement displayed on the display by the controller,
(D) conducting re-nesting on sections other than the parts arrangement locked in the locking by the controller, and
(E) preparing a nesting program according to all nesting results by the controller.

5. The automatic programming method as described in claim 4, wherein the locked parts arrangement is at least one of the parts and sheets.

* * * * *